United States Patent [19]
Crerar et al.

[11] 3,974,262
[45] Aug. 10, 1976

[54] TWO STAGE PROCESS FOR PRODUCING AMMONIUM PHOSPHATES

[75] Inventors: John David Crerar; John David Crowther Hemsley, both of Felixstowe, England

[73] Assignee: Fisons Limited, London, England

[22] Filed: Jan. 10, 1975

[21] Appl. No.: 539,990

[30] Foreign Application Priority Data
Jan. 16, 1974 United Kingdom............... 2138/74
Apr. 4, 1974 United Kingdom............. 14912/74

[52] U.S. Cl............................. 423/313; 71/43; 423/310
[51] Int. Cl.² .................. C01B 15/16; C01B 25/26
[58] Field of Search ..................... 423/310–313, 423/307–309; 71/43

[56] References Cited
UNITED STATES PATENTS

| | | |
|---|---|---|
| 2,902,342 | 9/1959 | Kerley..................................... 71/43 |
| 2,963,359 | 12/1960 | Moore et al. ....................... 423/312 |
| 3,310,371 | 3/1967 | Lutz........................................ 71/43 |
| 3,421,847 | 1/1969 | Such et al. ........................... 423/310 |
| 3,725,210 | 4/1973 | Otsuka et al..................... 260/555 A |
| 3,824,283 | 7/1974 | Harada et al. .................. 260/555 A |

*Primary Examiner*—Oscar R. Vertiz
*Assistant Examiner*—Gregory A. Heller
*Attorney, Agent, or Firm*—Wenderoth, Lind & Ponack

[57] ABSTRACT

The present invention relates to a two stage process for preparing ammonium phosphates in which ammonia at a comparatively low pressure and recovered from other processes is reacted with phosphoric acid in the liquid phase to yield an intermediate product which is then ammoniated further in the second stage under elevated pressure.

8 Claims, No Drawings

TWO STAGE PROCESS FOR PRODUCING AMMONIUM PHOSPHATES

The present invention relates to a process for the production of ammonium phosphates.

It has been proposed to produce ammonium phosphates by reacting ammonia under pressure with phosphoric acid to produce a boiling solution or slurry of ammonium phosphate which is expelled into a zone of lower pressure where water is disengaged from the ammonium phosphate, e.g. by a spray drying technique, to give a solid particulate product. In this process the necessary heat to maintain the reaction mixture at its boiling point is provided by the heat of reaction.

Surprisingly, we have now found that the pressure ammoniation process may be carried out in two stages, an initial low pressure stage where phosphoric acid is ammoniated in the liquid phase with ammonia at low pressure, thus enabling one to use by-product ammonia at a low pressure, e.g. the off-gases from a urea production process, and considered impractical for the high pressure process; followed by a pressure ammoniation step where the product from the first stage is ammoniated under higher pressure to give a boiling fluid ammonium phosphate which can be expelled into a zone at lower pressure to give a solid particulate product. Despite the fact that the process has been split into two stages, we have found that the heats of reaction are usually sufficient to provide the boiling fluid ammonium phosphate required at the end of the pressure ammoniation step without the need to provide extra external heat. Furthermore, by carrying out the first stage of the process in the liquid phase, e.g. by bubbling the ammonia into phosphoric acid in a stirred reactor, we have found that this stage can be operated under a wide range of conditions and temperatures to give a hotter more concentrated intermediate product for use in the second stage than when other forms of first stage reactor, e.g. scrubbing towers, are used. Moreover, the efficiency of absorption of ammonia is greater using a liquid phase reactor than when a conventional scrubbing system is used. Thus, the invention permits one to use low pressure by-product ammonia to carry out much of the ammoniation, rather than high grade high pressure ammonia.

Accordingly, the present invention provides a process for producing ammonium phosphates which process comprises reacting in the liquid phase in a first stage phosphoric acid with ammonia at a low pressure obtained from outside the process to produce a partially ammoniated product; passing the reaction product from the first stage to a second stage where it is reacted with ammonia at a higher pressure to form a fluid ammonium phosphate; and discharging this fluid ammonium phosphate into a zone of lower pressure.

The ammonia used in the first stage may be derived from a number of sources outside the process; that is the major source of ammonia is some external source, notably a by-product ammonia from some other process, rather than ammonia recovered from within the process. Typical sources include the off-gases from a urea production process or the low pressure ammonia losses available during the production of high pressure ammonia. Whilst the relative proportions of ammonia to other components of the ammonia source are to a large extent immaterial, we prefer to use sources which contain at least 4% by volume of $NH_3$. The ammonia for present use is typically generated at pressure, e.g. pressure of from 0.5 to 2.1 kg/cm² gauge, and may be used directly in the process of the invention without any deliberate intermediate purification step.

The phosphoric acid for use in the process of the invention may be thermal grade acid or wet process acid. Whilst this is not usually necessary, the latter type of acid may have been given a treatment to remove or sequester the major proportion of heavy metal and fluorine impurities therein. We prefer that the phosphoric acid contain at least 35% by weight of $P_2O_5$, e.g. from 38 to 60%, notably 44 to 52%, by weight of $P_2O_5$. Whilst orthophosphoric acid will usually be used in the process of the invention, the acid may contain appreciable quantities of linear or cyclic condensed phosphoric acid, e.g. polyphosphoric acid or metaphosphoric acids.

If desired, the phosphoric acid may be used in combination with up to 20% by weight of sulphuric acid. Alternatively, some sulphuric acid may be present in the phosphoric acid by virtue of its method of preparation. Furthermore, part or all of the phosphoric acid may contain some partially ammoniated phosphoric acid where the phosphoric acid has been used to recover ammonia losses from elsewhere in the process, e.g. in scrubbing the off-gases from the spray tower, granulator or drier, before it is used in the process of the invention; or where a solution of ammonium phosphates in water recovered by water scrubbing off-gases from later stages of the process is mixed with the phosphoric acid feed. For ease of handling it is preferred that such a partially ammoniated phosphoric acid have an $NH_3:H_3PO_4$ molar ratio in the ranges 0.1:1 to 0.6:1 or 1.2:1 to 1.45:1.

The reaction of the ammonia and the phosphoric acid in the first reaction stage is carried out in the liquid phase, as when ammonia gas is bubbled through phosphoric acid. A preferred method of operation is to react the ammonia and the phosphoric acid in a stirred reaction vessel.

The first reaction stage is usually carried out at from −0.1 to +1.5 Kg/cm² gauge, although ambient pressures may be used if desired, and without any external heating or cooling. The heat of reaction and/or the heat contained in the feed materials provides heat to bring the reaction mixture substantially to its boiling point. Depending upon the relative proportions of free phosphoric acid and ammonia fed to the reactor, further heat of reaction will be available to evaporate water from the reaction mixture. If desired, the phosphoric acid feed may be preheated to up to 90°C. The steam generated during the reaction is vented from the reaction vessel.

The reaction product from the first reaction stage is a hot solution or slurry of partially ammoniated phosphoric acid, i.e. ammonium phosphate, in water. It is preferred that the water content is in the range 10 to 45% by weight of the solution or slurry and is controlled to a large extent by the water content of the feed materials and also by the reaction conditions. In order that the solution or slurry be handleable, it is preferred that the ammonium phosphate therein have an $NH_3:H_3PO_4$ molar ratio of from 0.1:1 to 0.8:1, e.g. 0.2:1 to 0.7:1. However, it may be preferred to add part of the phosphoric acid to the second reaction stage, in which case the product from the first stage preferably has an $NH_3:H_3PO_4$ molar ratio of from 1.2:1 to 1.6:1.

The off-gases from the first stage will usually contain predominantly water vapour with little or no $NH_3$ or $P_2O_5$ when the first stage product has an $NH_3:P_2O_5$ molar ratio of 0.1:1 to 0.8:1 and may be discarded without the need to scrub the ammonia out of the off-gases. However, where the $NH_3:H_3PO_4$ molar ratio is higher, it will usually be necessary to scrub these off-gases with phosphoric acid to be used in the first reaction stage of the process of the invention, before they are discarded. If this is done, it will be appreciated that the recovered ammonia is supplementary to the ammonia from an external source used as the predominant ammonia feed to the first stage.

The hot solution or slurry from the first reaction stage is passed to a second reaction stage where it is reacted with further ammonia and possibly further phosphoric acid as indicated above. Sulphuric acid may also be included in the feed materials in order to increase the heat of reaction generated to aid removal of further water and to adjust the $NH_3:H_3PO_4$ molar ratio in the product from the second stage. This second stage is usually carried out at a higher pressure than the first stage, typically from 0.5 to 3.5 kg/cm², preferably 0.8 to 2.5 kg/cm², gauge and the solution or slurry from the first stage must therefore be pumped into the reaction vessel for the second stage. Whilst the ammonia for the second stage may be liquid, it is preferred to use substantially anhydrous gaseous ammonia, e.g. by gasification of liquid ammonia using hot air or steam. In view of the fact that by-product ammonia can be used in the first stage to achieve much of the overall ammoniation, the amount of high pressure and comparatively expensive ammonia required is significantly reduced.

The second reaction stage is carried out in a similar manner to the first stage, except at a higher pressure and temperature (typically 130° to 180°C depending upon the pressure used and the $NH_3:H_3PO_4$ molar ratios obtaining in the reaction vessel). It is preferred to carry out the second stage reaction by passing the ammonia through the solution or slurry in the bottom of a reaction vessel. The relative proportions of ammonia to solution or slurry used will depend upon the $NH_3:H_3PO_4$ molar ratio desired for the product. Typically, the product from the second stage will have an $NH_3:H_3PO_4$ molar ratio in the range 0.95:1 to 1.85:1, e.g. about 1:1 in the case of monoammonium phosphate, or 1.35:1 to 1.65:1 in the case where the product is to be used in the production of granular ammonium phosphates (as indicated below).

The product from the second reaction stage is a hot fluid ammonium phosphate which is usually at its boiling point by virtue of the heat of reaction liberated. If desired, external heat may be provided to maintain the reaction mixture at its boiling point, although this will usually not be necessary.

The hot fluid leaving the reaction vessel from the second stage typically contains from 4 to 20% by weight of water. This hot fluid is passed to a zone at lower pressure, which is preferably at ambient pressure. Water may be removed from the fluid by a spray drying technique in which the hot fluid is sprayed into a void tower to form a solid powder ammonium phosphate directly containing from 2 to 11%, tyically 5 to 8%, by weight of water. Alternatively, other solidification methods may be used. Thus, the hot fluid may be sprayed onto a belt to form a solid mass which is broken up into flakes or chips, or the hot fluid may be sprayed into a granulation device, such as a rotating drum or blunger device, onto a tumbling bed of particles to form a granular product. These particles may consist of recycled material and/or particles of other fertilizer ingredients (in which case the final product may be a granular mixed fertilizer). If desired, other fluid components may also be fed to the granulator, e.g. an aqueous solution or slurry of another fertilizer ingredient, such as a solution of ammonium nitrate. Where the hot fluid from the reaction stage is sprayed into a granulation device, ammonia may also be fed to the granulation device in order to increase the $NH_3:H_3PO_4$ molar ratio of the ammonium phosphate in the hot fluid. This method is particularly applicable to the production of granules containing ammonium phosphate of $NH_3:H_3PO_4$ molar ratios greater than 1.6:1, e.g. 1.7:1 to 2.1:1. The present invention therefore also provides a process wherein a hot fluid ammonium phosphate having an $NH_3:H_3PO_4$ molar ratio of less than 1.6:1 is produced by the first and second reaction stages of the process of the invention and this hot fluid is then sprayed onto a granulation device in which a bed of particles is being tumbled or agitated and to which ammonia is fed in order to raise the $NH_3:H_3PO_4$ molar ratio of the ammonium phosphate to a value greater than 1.6:1. In this process it may be advantageous to add free acid, e.g. phosphoric or sulphuric acid, to the granulation device.

Ammonia and/or particles of ammonium phosphate may be contained in the off-gases from the spray drying tower, the granulator and/or the granule drier. The ammonia values may be recovered, e.g. by scrubbing the off-gases with water or the phosphoric acid to be fed to the first and/or second stages of the process.

The process of the invention will be illustrated by the following Example in which all parts are by weight unless stated otherwise:

EXAMPLE 1

Off gases at 120°C and a pressure of 0.9 kg/cm² gauge from the partial recycle process for the manufacture of urea and containing 33.8% $NH_3$, 35.5% $CO_2$ and 30.8% $H_2O$ were fed at a rate of 4063 kg/hour into a stirred reaction vessel. Wet process phosphoric acid containing 52% $P_2O_5$ and at a temperature of 25°C was also fed into the reaction vessel at a rate of 13,483 kg/hour together with 1520 kg/hour of an approximately 10% solution of ammonium phosphate from the scrubbers as detailed below. The reaction vessel was operated at a pressure of 0.5 kg/cm² gauge and at 120°C to give a slurry of ammonium phosphate ($NH_3:H_3PO_4$ molar ratio of 0.75:1 and containing 15% water). The steam generated during the reaction (3521 kg/hour) and the $CO_2$ were cented from the reaction vessel.

The slurry was pumped at a rate of 14,106 kg/hour into a stainless steel stirred reaction together with ammonia gas at 100°C and 3 kg/cm² gauge at a rate of 419.4 kg/hour. The reactor was operated at 2.1 kg/cm² gauge and at 165°C to give a boiling polution of ammonium phosphate ($NH_3: H_3PO_4$ molar 1:1 and 11.5% $H_2O$). Steam generated during the reaction (473 kg/hour) was vented from the reactor.

The hot solution from the reactor was sprayed at a rate of 14,053 kg/hour into a void tower operated at ambient temperature and pressure to form solid particles of ammonium phosphate by flash evaporation of water. 13,286 kg/hour of solid product at 7.5% $H_2O$ were obtained. Approximately 138 kg/hour of ammonium phosphate were carried out of the tower in the airstream passing up the tower and recovered in water scrubbers to yield the 10% solution used in the first stage of the process.

We claim:

1. A process for producing solid ammonium phosphates which process comprises reacting in the liquid phase and at a pressure of from −0.1 to +1.5 kg/cm² in a first stage phosphoric acid containing from 35 to 60% by weight of $P_2O_5$ and up to 20% by weight of $H_2SO_4$ with gaseous ammonia, the major part of said ammonium gas having been obtained from a source outside the process, so as to produce a fluid ammonium phosphate having an $NH_3:H_3PO_4$ molar ratio which varies from 0.1:1 to 1.45:1 and a water content of from 10 to 45% by weight, passing this reaction product from the first stage to a second stage where it is reacted with gaseous ammonia at a pressure of from 0.5 to 3.5 kg/cm² to form a fluid ammonium phosphate having an $NH_3:H_3PO_4$ molar ratio of from 0.95:1 to 1.85:1 and containing from 4 to 20% by weight of water; and discharging this fluid ammonium phosphate into a zone of lower pressure to form a solid ammonium phosphate containing from 2 to 11% by weight of water.

2. A process as claimed in claim 1 wherein the ammonia used in the first stage is obtained from a source selected from a urea production process and the low pressure ammonia losses from a high pressure ammonia production process.

3. A process as claimed in claim 1 wherein the first stage is carried out to give a fluid ammonium phosphate substantially at its boiling point having an $NH_3:H_3PO_4$ molar ratio of from 0.1:1 to 0.8:1.

4. A process as claimed in claim 1 wherein the first stage is carried out to give a fluid ammonium phosphate having an $NH_3:H_3PO_4$ molar ratio of from 1.2:1 to 1.45:1.

5. A process as claimed in claim 1 wherein the product from the second stage is sprayed onto a tumbling bed of particles in a granulation device.

6. A process for producing particulate ammonium phosphate which comprises reacting the off-gases from a urea production process with phosphoric acid containing at least 35% $P_3O_5$ in a stirred reactor at a pressure of from −0.1 to +1.5 kg/cm² gauge to give a boiling fluid ammonium phosphate having an $NH_3:H_3PO_4$ molar ratio of from 0.1:1 to 0.8:1; passing the fluid ammonium phosphate to a pressure reactor operated at from 0.5 to 3.5 kg/cm² gauge and at 130° to 180°C where it is reacted with gaseous ammonia to give a boiling fluid ammonium phosphate having an $NH_3:H_3PO_4$ molar ratio of from 0.95:1 to 1.85:1 and containing from 4 to 20% of water; and expelling the fluid ammonium phosphate into a solidification zone at ambient pressure in which solid particles are formed.

7. A process as claimed in claim 6 wherein the solidification zone is a granulation device.

8. A process as claimed in claim 7 wherein the second stage is carried out to an $NH_3:H_3PO_4$ molar ratio of from 0.95:1 to 1.6:1 and the fluid ammonium phosphate is expelled into a granulation device into which ammonia is also fed.

* * * * *